(12) United States Patent
Hautier et al.

(10) Patent No.: US 9,338,004 B2
(45) Date of Patent: May 10, 2016

(54) METHOD AND SYSTEM FOR SMART CARD CHIP PERSONALIZATION

(71) Applicant: NAGRAVISION S.A., Cheseaux-sur-Lausanne (CH)

(72) Inventors: Roan Hautier, Cuarnens (CH); Marco Macchetti, Cheseaux-sur-Lausanne (CH); Jerome Perrine, Romanel sur Morges (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/432,426

(22) PCT Filed: Oct. 8, 2013

(86) PCT No.: PCT/EP2013/070889
§ 371 (c)(1),
(2) Date: Mar. 30, 2015

(87) PCT Pub. No.: WO2014/056876
PCT Pub. Date: Apr. 17, 2014

(65) Prior Publication Data
US 2015/0270962 A1 Sep. 24, 2015

Related U.S. Application Data

(60) Provisional application No. 61/712,274, filed on Oct. 11, 2012.

(30) Foreign Application Priority Data

Oct. 11, 2012 (EP) .................................... 12188097

(51) Int. Cl.
*H04L 9/00* (2006.01)
*H04L 9/08* (2006.01)
(Continued)

(52) U.S. Cl.
CPC .............. *H04L 9/0869* (2013.01); *G06F 21/31* (2013.01); *G06F 21/44* (2013.01); *G06F 21/572* (2013.01); *G06F 21/76* (2013.01); *H04L 9/14* (2013.01); *H04L 2209/24* (2013.01)

(58) Field of Classification Search
CPC ......... G06F 21/73; G06F 21/71; G06F 21/44; G06F 21/72; H04L 2209/56; H04L 2209/24; H04L 9/3236; H04L 9/14; H04L 9/3226

USPC .......................................... 380/2, 28; 705/67
See application file for complete search history.

(56) References Cited

U.S. PATENT DOCUMENTS 7,590,846 B2   9/2009   Girault
7,613,915 B2   11/2009  Srinivasan et al.
(Continued)

FOREIGN PATENT DOCUMENTS

EP   1441313   7/2004
EP   1983466   10/2008
(Continued)

OTHER PUBLICATIONS

International Search Report issued in International Application No. PCT/EP2013/070889 dated Dec. 12, 2013.
(Continued)

*Primary Examiner* — Brian Shaw
(74) *Attorney, Agent, or Firm* — DLA Piper LLP US

(57) ABSTRACT

Method and system for personalizing a chip, intended to be integrated into a smart card, comprising a tester associated to an FPGA device connected to the chip, the chip being part of a wafer comprising a plurality of chips and a disposable hardware module for verifying presence of the chip on the wafer. The tester sends a first secret code to the FPGA device, which commands the chip to initiate a test mode activation. The FPGA device encrypts a second secret code by using a secret encryption algorithm parameterized with a random number received from the chip and the first secret code to obtain a first cryptogram which is sent to the chip. The chip determines a second cryptogram by carrying out a Boolean function over a result obtained by decryption of the first cryptogram using the inverse algorithm parameterized with the random number and the first secret code. The second cryptogram is compared with a result obtained by carrying out the Boolean function over the second secret code temporarily stored on the chip. The FPGA device personalizes the chip only if the second cryptogram matches the calculated result.

13 Claims, 1 Drawing Sheet

(51) Int. Cl.
  *G06F 21/57* (2013.01)
  *G06F 21/76* (2013.01)
  *G06F 21/31* (2013.01)
  *G06F 21/44* (2013.01)
  *H04L 9/14* (2006.01)

(56) References Cited

U.S. PATENT DOCUMENTS

| | | |
|---|---|---|
| 8,595,498 B2 | 11/2013 | Junod |
| 8,601,247 B2 | 12/2013 | Srinivasan et al. |
| 8,621,188 B2 | 12/2013 | Srinivasan et al. |
| 8,856,513 B2 | 10/2014 | Srinivasan et al. |
| 2004/0193890 A1 | 9/2004 | Girault |
| 2008/0114984 A1 | 5/2008 | Srinivasan et al. |
| 2008/0263362 A1 | 10/2008 | Chen |
| 2010/0091988 A1 | 4/2010 | Srinivasan et al. |
| 2010/0095125 A1 | 4/2010 | Srinivasan et al. |
| 2010/0095134 A1 | 4/2010 | Srinivasan et al. |
| 2012/0069991 A1 | 3/2012 | Junod |
| 2014/0325240 A1 | 10/2014 | Srinivasan et al. |

FOREIGN PATENT DOCUMENTS

| | | |
|---|---|---|
| WO | WO 2008/057156 | 5/2008 |
| WO | WO 2010/130709 | 11/2010 |

OTHER PUBLICATIONS

Written Opinion issued in International Application No. PCT/EP2013/070889 dated Dec. 12, 2013.

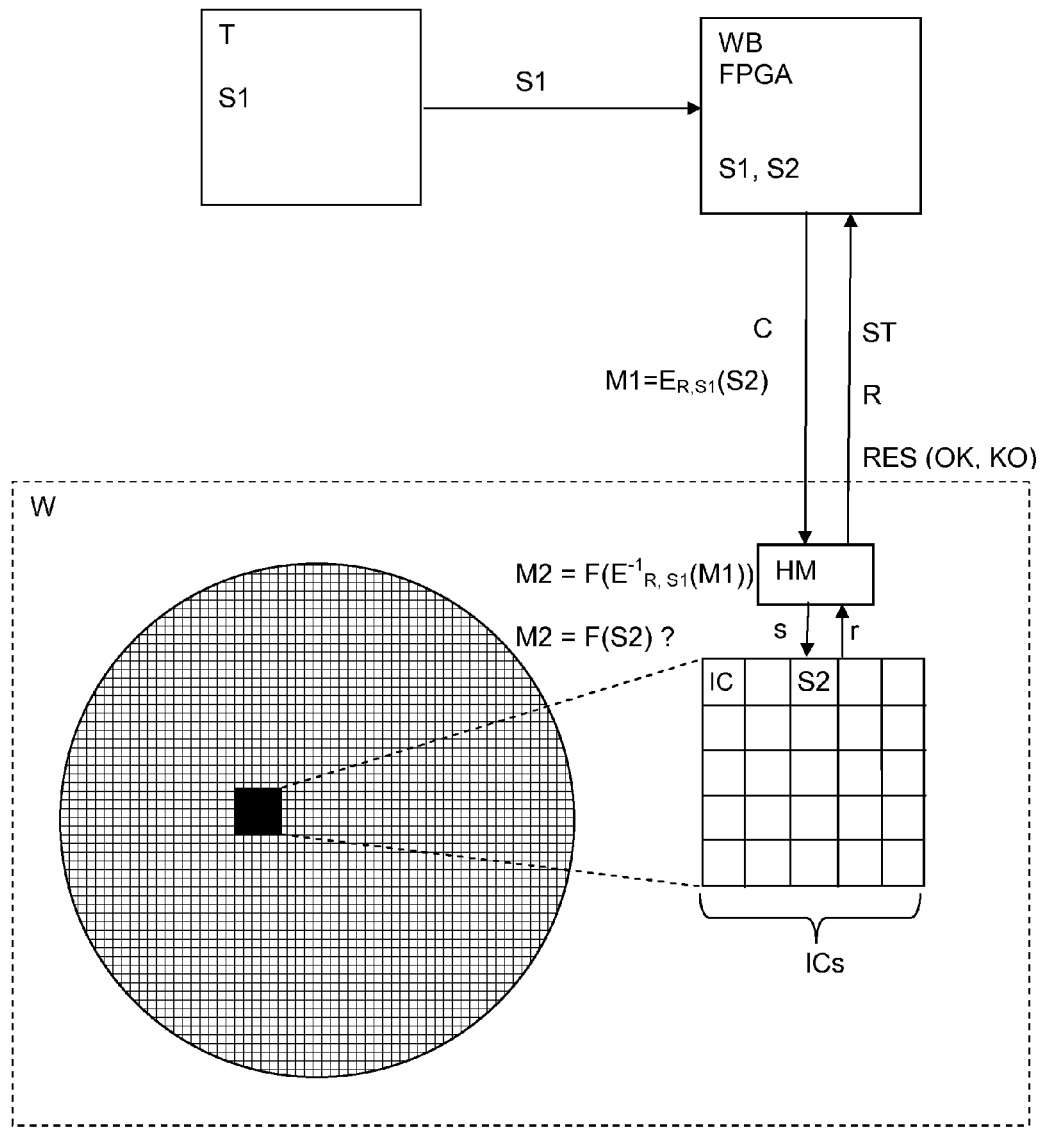

METHOD AND SYSTEM FOR SMART CARD CHIP PERSONALIZATION

CROSS REFERENCE TO RELATED APPLICATIONS

This application is a U.S. National Stage Application of International Application No. PCT/EP2013/070889 filed Oct. 8, 2013, which claims priority to European Patent Application No. 12188097.5 filed Oct. 11, 2012 and U.S. Provisional Patent Application No. 61/712,274 filed Oct. 11, 2012.

FIELD OF THE INVENTION

The invention relates to the domain of smart card chip personalization during which unique secrets and application code are embedded. In particular, the steps of personalization are performed under controlled conditions to prevent cloning and re-programming smart cards in the field.

TECHNICAL BACKGROUND

Secured chips are mostly used in manufacturing of smart cards, security modules, identification devices and other integrated circuits used in applications requiring a high security level.

Document WO2010/130709A1 discloses a method for authenticating access to a secured chip by a test device. Once the test device is authenticated with the chip, i.e. successful verifications have been made by control data exchanges between the test device and the chip, the different operating tests or simulations are carried out on hardware and software functions and/or programs implemented in the chip. The test device can also comprise functionalities of configuration or customization of the chip by enabling, disabling or programming features according to the applications requirements foreseen for the chip. According to a preferred implementation, one advantage of this method is minimizing the data transfer between the test device and the secured chip. In response of a challenge produced by the chip, the test device sends a cryptogram which will be analyzed and verified by the chip before authorizing the test device to perform tests on said chip.

The document EP1441313 handles on an asymmetrical cryptographic method of protecting a hard-wired electronic logic chip against fraud in transactions between the electronic chip and an application including calculating an authentication value from input parameters in the electronic chip. The method comprises the steps of: producing by the chip a random number specific to the transaction; sending to the application a first parameter calculated by the application prior to the transaction, linked to the random number by a mathematical relationship, and stored in a data memory of the chip; calculating by the chip a second parameter constituting an authentication value by means of a serial function whose input parameters are at least the random number specific to the transaction and a private key belonging to an asymmetrical key pair; sending the authentication value to the application, and verifying said authentication value by means of a verification function whose input parameters consist exclusively of public parameters including at least the public key.

The document EP1983466 describes method and apparatus of secure authentication for system on a chip (SoC). The SoC may enable authentication of an external entity attempting to gain access to a function or system. The SoC and an authorized external entity may each have knowledge of hidden data prior to an authentication attempt and may communicate data during the authentication process as well. Using like data, the SoC and external entity may be able to generate the same password and achieve system access. Passwords may be unique in two ways, for example: per operation and per SoC device. A random number generator on board the SoC may enable the passwords to vary for each iteration of the authentication process. Each instance of a SoC has its own secret word allowing passwords to be unique for each device.

After manufacturing, smart card integrated circuits or chips need to be personalized to embed unique secrets and to load application code in a very secure way to prevent cloning or reprogramming smart cards made with these chips. Classical solutions are based on a dedicated computer station that allows instructed personnel to program the cards at personalization facility (in-house or external). This approach has many weak aspects and to overcome these issues following requirements are considered:

a) Render personalization possible only at wafer level and extremely difficult to re-activate with physical means once the wafer is cut and the chip are packaged.

b) The personalization activation should not rely only on a single secret or on software package that can be owned (and leaked) by personnel at personalization facility.

c) Render replaying personalization sequences impossible in order to clone chips intended to be implemented in smart cards.

d) Prevent complete reverse engineering of the smart card chip allowing an attacker reproducing the chip personalization.

SUMMARY OF THE INVENTION

The aims of the invention is to best fulfill the above mentioned requirements concerning the personalization of smart card chips and to overcome drawbacks of the prior art solutions.

The aim is achieved by a method for personalizing at least one chip, intended to be integrated into a smart card, involving a tester associated to a (Field Programmable Gate Array) FPGA device connected to the chip, the chip being part of a wafer comprising an arrangement of a plurality of chips, comprising steps of:

sending by the tester a first secret code to the FPGA device, said first secret code being stored permanently in a memory of the tester, sending by the FPGA device a command to the chip to initiate a sequence of a test mode activation sending by the chip a signal to a disposable hardware module arranged on the wafer, said hardware module returning a response indicating presence of the chip on the wafer, generating and sending by the chip a random number to the FPGA device, encrypting by the FPGA device a second secret code by using a secret encryption algorithm parameterized with the random number and the first secret code, obtaining a first cryptogram, sending by the FPGA device the first cryptogram to the chip, determining by the chip a second cryptogram by carrying out a Boolean function over a result obtained by decrypting the first cryptogram using the inverse of the secret encryption algorithm parameterized with the random number and the first secret code, comparing by the chip the second cryptogram with a result obtained by carrying out the Boolean function over the second secret code temporarily stored on the chip, if the second cryptogram corresponds with the result obtained by carrying out the Boolean function over the second secret code, enabling the test mode sequence, sending by the chip a response message to the FPGA device, performing, by the FPGA device, personalization of the chip if the message includes a positive response.

The invention further relates to a system configured for personalizing at least one chip, intended to be integrated into a smart card, comprising a tester associated to a (Field Programmable Gate Array) FPGA device connected to the chip, the chip being part of a wafer comprising an arrangement of a plurality of chips and a disposable hardware module, characterized in that:

the tester is configured to send a first secret code to the FPGA device, said first secret code being stored permanently in a memory of the tester, the FPGA device is configured to send a command to the chip to initiate a sequence of a test mode activation, to encrypt a second secret code by using a secret encryption algorithm parameterized with a random number received from the chip and the first secret code, to obtain and send a first cryptogram to the chip, the disposable hardware module is configured to receive a signal from the chip and to return a response indicating presence of the chip on the wafer, the chip is configured to determine a second cryptogram by carrying out a Boolean function over a result obtained by decryption of the first cryptogram using the inverse of the secret encryption algorithm parameterized with the random number and the first secret code, and to compare the second cryptogram with a calculated result obtained by carrying out the Boolean function over the second secret code temporarily stored on the chip, the FPGA device is further configured to perform personalization of the chip only if the test mode of the chip is enabled by a successful comparison between the second cryptogram and the calculated result.

As usual, personalization is possible only when smart card chip is in a special state, called "test mode". Therefore the solution is mainly, but not only, focused on rendering activation of test mode very secure.

The test mode activation protection is based on several security features, namely:

Utilization of an anti-reverse challenge-response protocol based on the method described in document WO2010/130709A1.

Utilization of a hardware module to verify presence of the chip on the wafer. This hardware module is destructed after wafer cutting, Utilization of an electronic board embedding an FPGA device, called "waferbox" which is mechanically and electrically integrated within the tester equipment, Implementation of a True Random Number Generator (TRNG) in the smart card chip that renders the personalization transaction statistically unique.

BRIEF DESCRIPTION OF THE FIGURE

The invention will be better understood with the following detailed description, which refers to the attached FIGURE given as a non-limitative example.

FIG. 1 shows a block schematic representing the system of the invention comprising a tester associated to a FPGA device connected to at least one chip of a wafer. Before personalization, the chip is set up in a test mode by secure data exchanges and verifications performed by the tester and the FPGA device.

DETAILED DESCRIPTION OF THE INVENTION

The system illustrated by FIG. 1 comprises a tester T associated to a FPGA device WB also called "waferbox" which configuration file is secured with known methods to prevent cloning. The test mode activation as well as the personalization process are preferably performed at wafer level i.e. the chips are arranged on a wafer used for their manufacturing. A hardware module HM preferably implemented on the wafer plays a role of interface between the FPGA device WB and the chips ICs on the wafer W and is in charge of verifying presence of the chip (s) ICs on the wafer W after initialization of the test mode. This verification prevents manipulations or attempt to modify personalization parameters when a chip is cut out of the wafer or integrated in a smart card in service in the field. The hardware module HM is destroyed at the end of personalization process during wafer cutting in order to separate all chips. Beside this physical security means, software and communication security means are also used to protect the sensitive personalization process. The combination of physical and software means prevents personalization by third parties owning only the necessary software programs without any link with a disposable physical hardware circuitry.

At the beginning of the personalization process, the tester T is powered on as well as the FPGA device and the chip IC. The tester T reads and sends to the FPGA device WB a first secret code S1 which is retrieved from a permanent memory of the tester T. To initiate entering the chip in a test mode, the FPGA device sends a command C to the chip IC which sends a signal s to the hardware module HM arranged on the wafer W. The hardware module HM returns a response r to the chip indicating its presence on the wafer i.e. not stand alone or integrated in a device connected to the FPGA device WB.

In case the chip IC does not receive a response r from the hardware module HM, the connection with the hardware module HM may be defective or the chip IC is detached from the wafer W. The tester T respectively the FPGA device WB in communication with the hardware module HM stops processing and an error message may be displayed. Preferably, a status indicator ST (chip on the wafer/chip out of the wafer) may be reported to the FPGA device WB before continuation of the test mode sequence activation. This status indicator ST may be included in a response to the initialization command C.

After the successful communication with the hardware module HM, the chip IC generates a random number R and forwards it to the FPGA device WB. The random number R is preferably a true random i.e. produced with a hardware True Random Number Generator (TRNG) to improve statistical uniqueness of the result.

There are two principal methods used to generate random numbers: a first method is based on some physical phenomenon measurement (noise in semi-conductor elements for example) that is expected to be random and then compensates for possible biases in the measurement process. The second method uses computational algorithms that can produce long sequences of apparently random results, which are in fact completely determined by a shorter initial value, known as a seed or key. The latter type of generator is often called pseudo-random number generator. A "random number generator" based solely on deterministic computation cannot be regarded as a "true" random number generator, since its output is inherently predictable.

The FPGA device WB encrypts a second secret code S2 by using a secret encryption algorithm E parameterized with the random number R and the first secret code S1 to obtain a first cryptogram $M1=E_{R, S1}(S2)$ which is sent to the chip IC.

The chip IC calculates a second cryptogram $M2=F(E^{-1}_{R, S1}(M1))$ by applying a Boolean function F over a result obtained by decrypting the received first cryptogram M1 with the inverse of the secret encryption algorithm $E^{-1}$ parameterized with the random number R and the first secret code S1. This second cryptogram M2 is then compared by the chip IC with a result obtained by applying the Boolean function F over the second secret code S2 which is temporarily stored in the chip IC. If the comparison is successful, i.e. M2=F(S2), the test mode sequence is enabled so that the chip IC is ready to be personalized. Otherwise the previous steps starting by a new random number R generation may be repeated or the process is stopped due to security failures or other defects. Each data exchange between the FPGA device WB is statistically unique thanks to the true random number R used in the encryption/decryption algorithm E to calculate the cryptograms M1 and M2.

The Boolean function F may be preferably a cryptographic one-way function such as a hash function of type SHA256 for example as described in document WO2010/130709A1. Even the function F is known, it is quite impossible to recover the original value $E^{-1}_{R, S1}(M1)$ from the resulting cryptogram M2.

The FPGA device WB receives response message RES as OK or KO from the chip IC indicating that personalization steps can be executed or not.

According to a preferred configuration, the first secret code S1 and the second secret code S2 constitute parts of a global secret code S. The first secret code S1 is stored in a permanent memory of the tester T and in a permanent memory of the chip IC and stored in a non permanent random access memory RAM of the FPGA device WB. The second secret code S2 is stored in a permanent memory of the FPGA device WB and stored in a non permanent random access memory RAM of the chip IC. The sharing of the secret code S by storing the secret codes S1 and S2 in the respective memories of the FPGA device and of the chip IC may be carried out at start of the tester T when connections of the system elements are initialized.

The FPGA device WB is further configured to have access to encrypted non-volatile memory for loading application code in to the chip IC during the personalization phase. This memory may contain several versions of the application code so that the tester T respectively the FPGA device WB selects a predefined version of an application code stored in the memory of the chip (IC). According to an embodiment, the application code is sent by the FPGA device WB to the chip (IC) in a secure way by encryption using an algorithm depending on a true random number in a similar manner than in the process of test mode activation described above.

According to a further embodiment the FPGA device WB is mechanically and electrically connected to the tester T in such a way to be physically inaccessible by users of the tester T during chip personalization phase. Furthermore the electronic modules composing the FPGA device WB are made tamper-proof or tamper-evident.

The FPGA device WB transmits to the tester T information comprising its current state data and history data of the personalized chip IC for traceability purposes.

The invention claimed is:

1. A method for personalizing at least one chip, intended to be integrated into a smart card, comprising:
    sending by a tester a first secret code to a Field Programmable Gate Array (FPGA) device connected to the at least one chip, the at least one chip being part of a wafer comprising an arrangement of a plurality of chips, the tester being associated to the FPGA device, said first secret code being stored permanently in a memory of the tester;
    sending by the FPGA device a command to the at least one chip to initiate a sequence of a test mode activation;
    sending by the at least one chip a signal to a disposable hardware module arranged on the wafer and receiving from, said disposable hardware module a response indicating presence of the at least one chip on the wafer;
    generating and sending by the at least one chip a random number to the FPGA device;
    encrypting by the FPGA device a second secret code by using a secret encryption algorithm parameterized with the random number and the first secret code, to obtain a first cryptogram;
    sending by the FPGA device the first cryptogram, to the at least one chip;
    determining by the at least one chip a second cryptogram by carrying out a Boolean function over a result obtained by decrypting the first cryptogram using the inverse of the secret encryption algorithm parameterized with the random number and the first secret code;
    comparing by the at least one chip the second cryptogram with a result obtained by carrying the Boolean function over the second secret code temporarily stored on the at least one chip;
    if the second cryptogram corresponds to the result obtained by carrying out the Boolean function over the second secret code, enabling the test mode activation;
    sending by the at least one chip a response message to the FPGA device; and
    performing, by the FPGA device, personalization of the at least one chip if the response message includes a positive response,
    wherein personalization comprises storing unique secret data on the at least one chip.

2. The method according to claim 1 wherein the first secret code and the second secret code constitute parts of a global secret code, the first secret code being stored in a permanent memory of the tester and in a permanent memory of the at least one chip and being stored in a non-permanent random access memory of the FPGA device, the second secret code being stored in a permanent memory of the FPGA device and stored in a non-permanent random access memory of the at least one chip.

3. The method according to claim 1, wherein the Boolean function is a cryptographic one-way hash function of type SHA256.

4. The method according to claim 1, wherein the random number is a true random number produced with a hardware True Random Number Generator.

5. The method according to claim 1, wherein a status indicator indicating presence of the at least one chip on the wafer is reported to the FPGA device by the disposable hardware module before continuation of the test mode sequence activation, said status indicator being included in a response to the command to initiate the sequence of the test mode activation.

6. The method according to claim 1, wherein the disposable hardware module is destroyed during cutting of the wafer in order to separate the plurality of chips.

7. The method according to claim 1, wherein the activation of the test mode is carried out on the plurality of chips on the wafer in parallel.

8. A system configured for personalizing at least one chip, intended to be integrated into a smart card, comprising:
   a tester;
   a Field Programmable Gate Array (FPGA) device associated with the tester;
   a chip connected to the FPGA device, the chip being part of a wafer comprising an arrangement of a plurality of chips; and
   a disposable hardware module;
   wherein the tester is configured to send a first secret code to the FPGA device, said first secret code being stored permanently in a memory of the tester;
   wherein the FPGA device is configured to send a command to the chip which initiates a sequence of a test mode activation, to encrypt a second secret code by using a secret encryption algorithm parameterized with a random number received from the chip and the first secret code, to obtain a first cryptogram;
   wherein the FPGA device is configured to send the first cryptogram to the chip;
   wherein the disposable hardware module is configured to receive a signal from the chip and to return a response indicating presence of the chip on the wafer;
   wherein the chip is configured to determine a second cryptogram by carrying out a Boolean function over a result obtained by decryption of the first cryptogram using the inverse of the secret encryption algorithm parameterized with the random number and the first secret code, and to compare the second cryptogram with a calculated result obtained by carrying out the Boolean function over the second secret code temporarily stored on the chip;
   wherein the FPGA device is further configured to perform personalization of the chip only if the test mode of the chip is enabled by a successful comparison between the second cryptogram and the calculated result, and
   wherein personalization comprises storing unique secret data on the chip.

9. The system according to claim 8, wherein the FPGA device is further configured to access encrypted non-volatile memory of the chip and to load application code into the chip during the personalization.

10. The system according to claim 9, wherein the FPGA device is configured to select a predefined version of an application code stored in the encrypted non-volatile memory of the FPGA among a plurality of versions of the application code stored in the encrypted non-volatile memory of the FPGA device.

11. The system according to claim 9, wherein the FPGA device is configured to send the application code to the chip with the application code encrypted using an algorithm depending on a true random number previously produced by the chip.

12. The system according to claim 8, wherein the FPGA device is provided with tamper-proof or tamper-evident modules and mechanically and electrically connected to the tester in such a way to be physically inaccessible by users of the tester during chip personalization.

13. The system according to claim 8, wherein the FPGA device is configured to transmit to the tester information comprising current state data of said FPGA device and history data of the personalized chip for traceability purposes.

* * * * *